(12) United States Patent
Handschuh et al.

(10) Patent No.: US 9,296,157 B1
(45) Date of Patent: Mar. 29, 2016

(54) HYBRID GEAR

(75) Inventors: Robert F Handschuh, North Olmsted, OH (US); Gary D Roberts, Medina County, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 121 days.

(21) Appl. No.: 13/542,163

(22) Filed: Jul. 5, 2012

Related U.S. Application Data

(60) Provisional application No. 61/505,727, filed on Jul. 8, 2011.

(51) Int. Cl.
*F16H 55/06* (2006.01)
*B29C 70/84* (2006.01)

(52) U.S. Cl.
CPC ............... *B29C 70/84* (2013.01); *F16H 55/06* (2013.01); *F16H 2055/065* (2013.01)

(58) Field of Classification Search
CPC ......... F16H 55/06; F16H 55/14; F16H 55/17; F16H 55/12; F16H 55/171; F16H 57/0006; F16H 7/023; F16H 2055/065; B29L 2015/003; B29C 70/84; B29K 2621/00; B29K 2995/0089; B29K 2705/00; Y10S 74/10
USPC .................. 74/411, 443, 445, 446, 447, 448, 74/DIG. 10; 29/893.37; 156/558; 474/161
See application file for complete search history.

(56) References Cited

U.S. PATENT DOCUMENTS

| | | | | |
|---|---|---|---|---|
| 1,501,026 A | * | 7/1924 | Guay | 74/445 |
| 1,501,027 A | * | 7/1924 | Guay | 74/445 |
| 1,501,028 A | * | 7/1924 | Guay | 74/445 |
| RE16,161 E | * | 9/1925 | Talley | 74/445 |
| 1,601,913 A | * | 10/1926 | Guay | 74/445 |
| 1,638,012 A | * | 8/1927 | Hoof | 428/66.1 |
| 1,761,114 A | * | 6/1930 | Frederick | 74/445 |
| 1,778,789 A | * | 10/1930 | Benge | 74/445 |
| 1,813,819 A | * | 7/1931 | Ross | 74/443 |
| 1,824,825 A | * | 9/1931 | Mains | 428/66.1 |
| 1,891,937 A | * | 12/1932 | Mansur | 74/445 |
| 1,943,024 A | * | 1/1934 | Lytle | 428/37 |
| 1,981,782 A | * | 11/1934 | D'Aubigne | 74/445 |
| 1,984,113 A | * | 12/1934 | Wesley | 428/66.1 |
| 2,000,769 A | * | 5/1935 | Mansur | 428/66.1 |
| 2,050,916 A | * | 8/1936 | Benge et al. | 74/445 |
| 2,064,144 A | * | 12/1936 | Benge | 74/445 |
| 2,064,723 A | * | 12/1936 | Benge | 74/445 |
| 2,111,590 A | * | 3/1938 | Hoof | 74/445 |
| 2,229,982 A | * | 1/1941 | Mansur et al. | 428/66.1 |
| 2,231,427 A | * | 2/1941 | Larsh et al. | 29/893.37 |
| 2,307,129 A | * | 1/1943 | Hines et al. | 464/89 |
| 2,460,630 A | * | 2/1949 | Fawick | 74/411 |
| 2,720,119 A | * | 10/1955 | Sherman | 74/460 |
| 2,748,618 A | * | 6/1956 | Lee | 74/439 |

(Continued)

*Primary Examiner* — Terence Boes
(74) *Attorney, Agent, or Firm* — Robert H. Earp, III

(57) ABSTRACT

A hybrid gear consisting of metallic outer rim with gear teeth and metallic hub in combination with a composite lay up between the shaft interface (hub) and gear tooth rim is described. The composite lay-up lightens the gear member while having similar torque carrying capability and it attenuates the impact loading driven noise/vibration that is typical in gear systems. The gear has the same operational capability with respect to shaft speed, torque, and temperature as an all-metallic gear as used in aerospace gear design.

6 Claims, 10 Drawing Sheets

(56) References Cited

U.S. PATENT DOCUMENTS

| | | | | |
|---|---|---|---|---|
| 2,839,943 A * | 6/1958 | Hausmann et al. | | 74/445 |
| 2,859,635 A * | 11/1958 | Lee | | 74/439 |
| 3,199,364 A * | 8/1965 | Dew | | 74/460 |
| 3,200,665 A * | 8/1965 | Martin | | 74/446 |
| 3,257,860 A * | 6/1966 | Runde et al. | | 474/94 |
| 3,307,419 A * | 3/1967 | Brickett et al. | | 74/443 |
| 3,610,066 A * | 10/1971 | Rychlik | | 74/434 |
| 4,078,445 A | 3/1978 | Kiser, Jr. | | |
| 4,174,643 A * | 11/1979 | Tsukamoto | | 74/443 |
| 4,302,986 A * | 12/1981 | Shepherd | | 74/574.4 |
| 4,326,849 A * | 4/1982 | Van Zijderveld | | 474/161 |
| 4,674,351 A * | 6/1987 | Byrd | | 74/443 |
| 4,722,722 A * | 2/1988 | Rampe | | 474/161 |
| 4,946,427 A * | 8/1990 | Rampe | | 474/161 |
| 4,993,651 A * | 2/1991 | Ohno et al. | | 242/570 |
| 5,074,828 A * | 12/1991 | Ellis | | 474/161 |
| 5,285,699 A * | 2/1994 | Walls et al. | | 74/572.12 |
| 5,307,705 A * | 5/1994 | Fenelon | | 74/411 |
| 5,452,622 A * | 9/1995 | Fenelon | | 74/411 |
| 5,852,951 A * | 12/1998 | Santi | | 74/443 |
| 6,053,060 A * | 4/2000 | Tumberlinson et al. | | 74/7 R |
| 6,755,094 B2 * | 6/2004 | Rehle et al. | | 74/443 |
| 6,875,113 B2 * | 4/2005 | Nichols | | 464/90 |
| 7,197,959 B2 * | 4/2007 | Crissy | | 74/574.4 |
| 7,503,864 B2 * | 3/2009 | Nonoshita et al. | | 474/160 |
| 8,397,602 B2 * | 3/2013 | Christenson et al. | | 74/574.4 |
| 8,585,934 B2 * | 11/2013 | Shah et al. | | 252/502 |
| 8,690,546 B2 * | 4/2014 | Standke | | 417/319 |
| 2011/0024694 A1 * | 2/2011 | Shah et al. | | 252/502 |
| 2011/0250070 A1 * | 10/2011 | Demtroder | | 416/170 R |

* cited by examiner

HYBRID GEAR

CROSS-REFERENCE TO RELATED APPLICATIONS

This application claims the benefit of U.S. Provisional Patent Application No. 61/505,727 filed on Jul. 8, 2011, which is incorporated herein by reference.

STATEMENT REGARDING FEDERALLY SPONSORED RESEARCH OR DEVELOPMENT

The embodiment described herein was made by an employee of the United States Government and may be manufactured and used by or for the Government for Government purposes without the payment of any royalties thereon or therefore.

TECHNICAL FIELD OF THE INVENTION

The present disclosure relates to gears, and more particularly to a gear design consisting of metal in combination with fiber-resin composite materials.

BACKGROUND OF THE INVENTION

A gear is a rotating machine part having cut teeth or cogs that engage or mesh with another toothed part, such as another gear, in order to transmit rotational power. Two or more gears working in tandem are called a transmission and can produce a mechanical advantage through a gear ratio and thus may be considered a simple machine. Geared devices can change the speed, torque, and direction of a power source. The most common situation is for a gear to mesh with another gear, however a gear can also mesh a non-rotating toothed part, called a toothed rack, thereby producing translational motion instead of rotation.

The earliest known reference to gears was circa A.D. 50 by Hero of Alexandria, but they can be traced back to the Greek mechanics of the Alexandrian school in the 3rd century B.C. and were greatly developed by the Greek polymath Archimedes (287-212 B.C.).

Gears made from a rigid material such as metal or metal alloys are well known and are used in many applications. Such gears may withstand high torque, but have a significant shortcoming in that they tend to be heavy and also to generate a great deal of noise when they mesh with other metal gears.

Gears of the sort used in toys and light-weight consumer appliances can be made of light-weight thermoplastic and thermosetting materials, because their loading tends to be almost trivial, as, for example, in the case of small clocks. However, modern power-transmission gears that convey tens of kilowatts and greater amounts of power find use used in stationary equipment, in ships and in cars, motorcycles and aircraft. The weight of gears tends not to be critical in stationary applications or in large ships. But in lightweight transportation systems including cars, motorcycles, bicycles and especially aircraft, weight is an important consideration.

More specifically, gears used in rotorcraft applications are designed such that the minimum weight is attained without sacrificing reliability or safety. Since the drive system is an appreciable percentage of the overall rotorcraft vehicle weight (~10%), many approaches have been applied to improve the power to weight ratio of these components.

SUMMARY OF THE DISCLOSURE

According to a preferred embodiment, a hybrid gear comprises a metal gear rim portion with a plurality of gear teeth projecting outward (or inward) from the gear rim portion. A gear hub portion is disposed within the gear rim portion and a web of a composite material joins the gear rim portion to the gear hub portion.

According to another preferred embodiment, a method of constructing a hybrid gear comprises: providing a metal gear rim portion; disposing a metal gear hub portion within the gear rim portion; and joining the gear rim portion to the gear hub portion with a web of a composite material joining the gear rim portion to the gear hub portion.

According to another preferred embodiment, a method of constructing a hybrid gear comprises: providing a metal gear rim portion; disposing a metal gear web and shaft with a web and shaft of a composite material.

BRIEF DESCRIPTION OF THE DRAWINGS

The structure, operation, and advantages of the present invention will become further apparent upon consideration of the following description taken in conjunction with the accompanying figures (FIGS.). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (FIGs) of the drawing, in which case typically the last two significant digits may be the same, the most significant digit being the number of the drawing figure (FIG).

FIG. 1A is an oblique view of a hybrid gear according to the present disclosure.

FIG. 1B is an orthogonal axial view of the hybrid gear according to the present disclosure.

FIG. 1C is an orthogonal side view of the hybrid gear according to the present disclosure.

FIG. 1D is an orthogonal cut-away view of the hybrid gear according to the present disclosure.

FIG. 2A is an oblique view of the hub portion of the hybrid gear according to the present disclosure.

FIG. 2B is an oblique view of the web portion of the hybrid gear according to the present disclosure.

FIG. 2C is an oblique view of the rim portion and gear teeth of the hybrid gear according to the present disclosure.

FIG. 3 is an oblique exploded view of the assembly of the rim and hub portions of the hybrid gear according to the present disclosure along with the web and the first and second layers of composite material.

FIG. 4 shows two orthogonal views of a second embodiment of the hybrid gear.

FIG. 5 shows an orthogonal cut-away view of a third embodiment of the hybrid gear.

FIG. 6 shows two graphs of raw vibration data.

Figure 7:
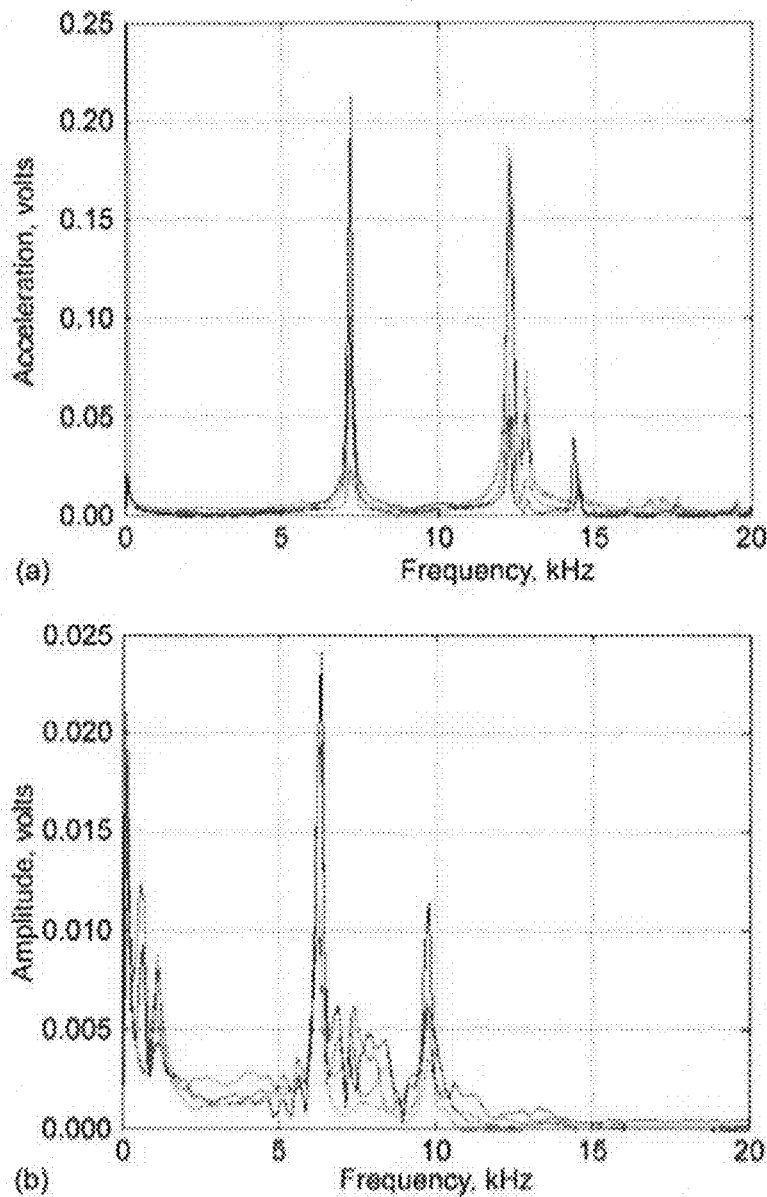

FIG. 7 shows two graphs of frequency domain data.

Figure 8:
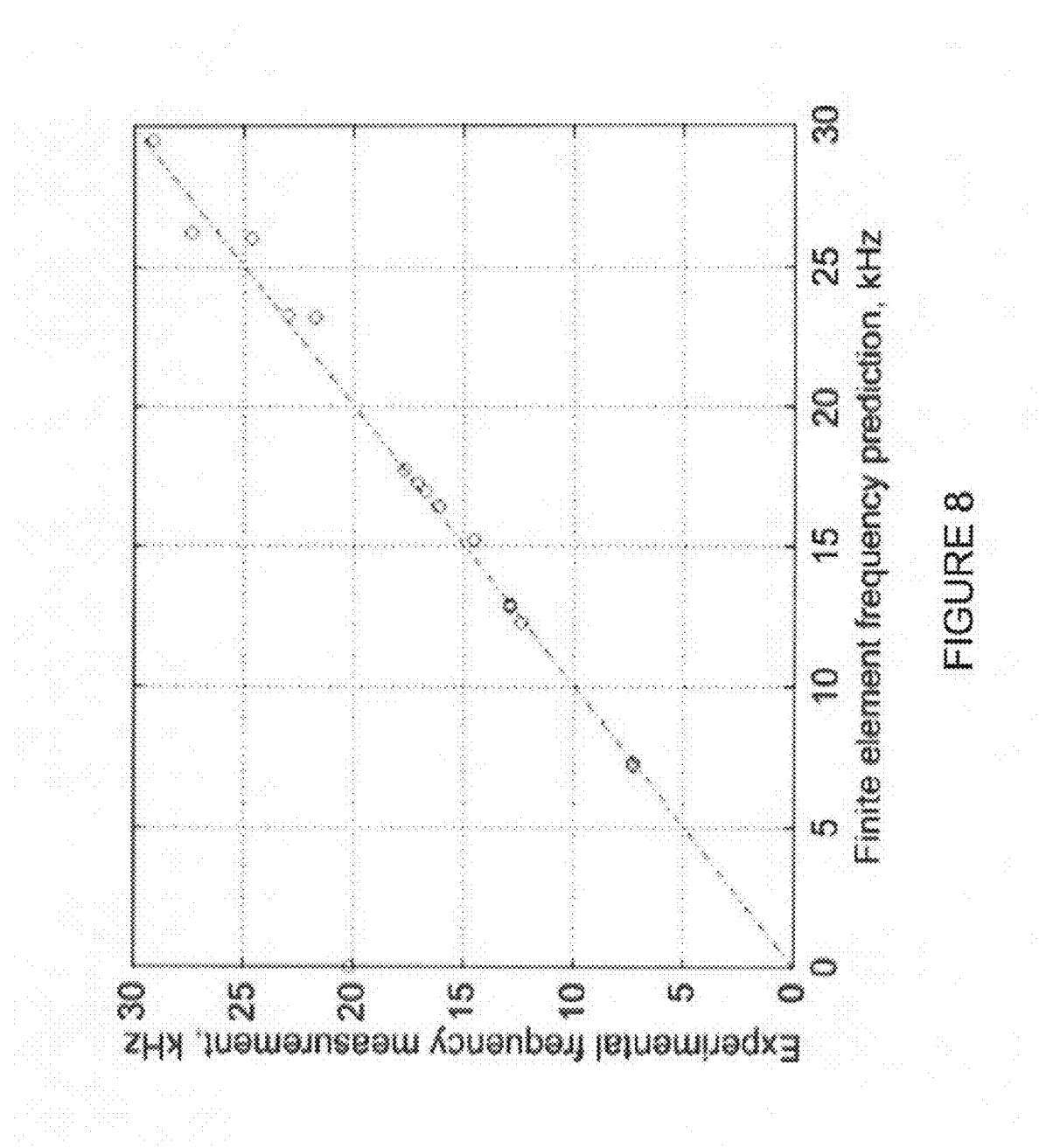

FIG. 8 is a graph showing a comparison of experiment and finite element natural frequencies.

Figure 9:
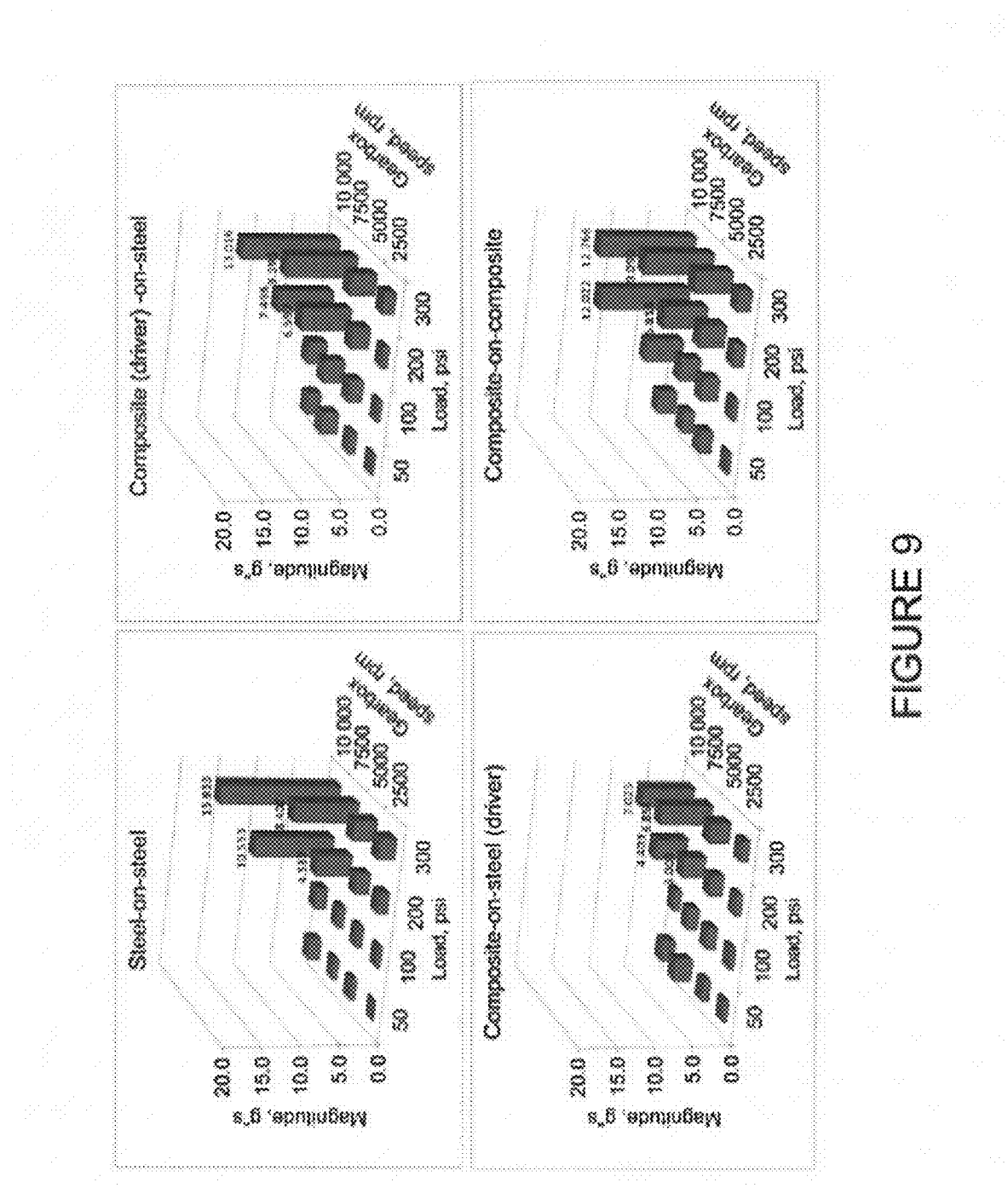

FIG. 9 illustrates vibration data.

Figure 10:
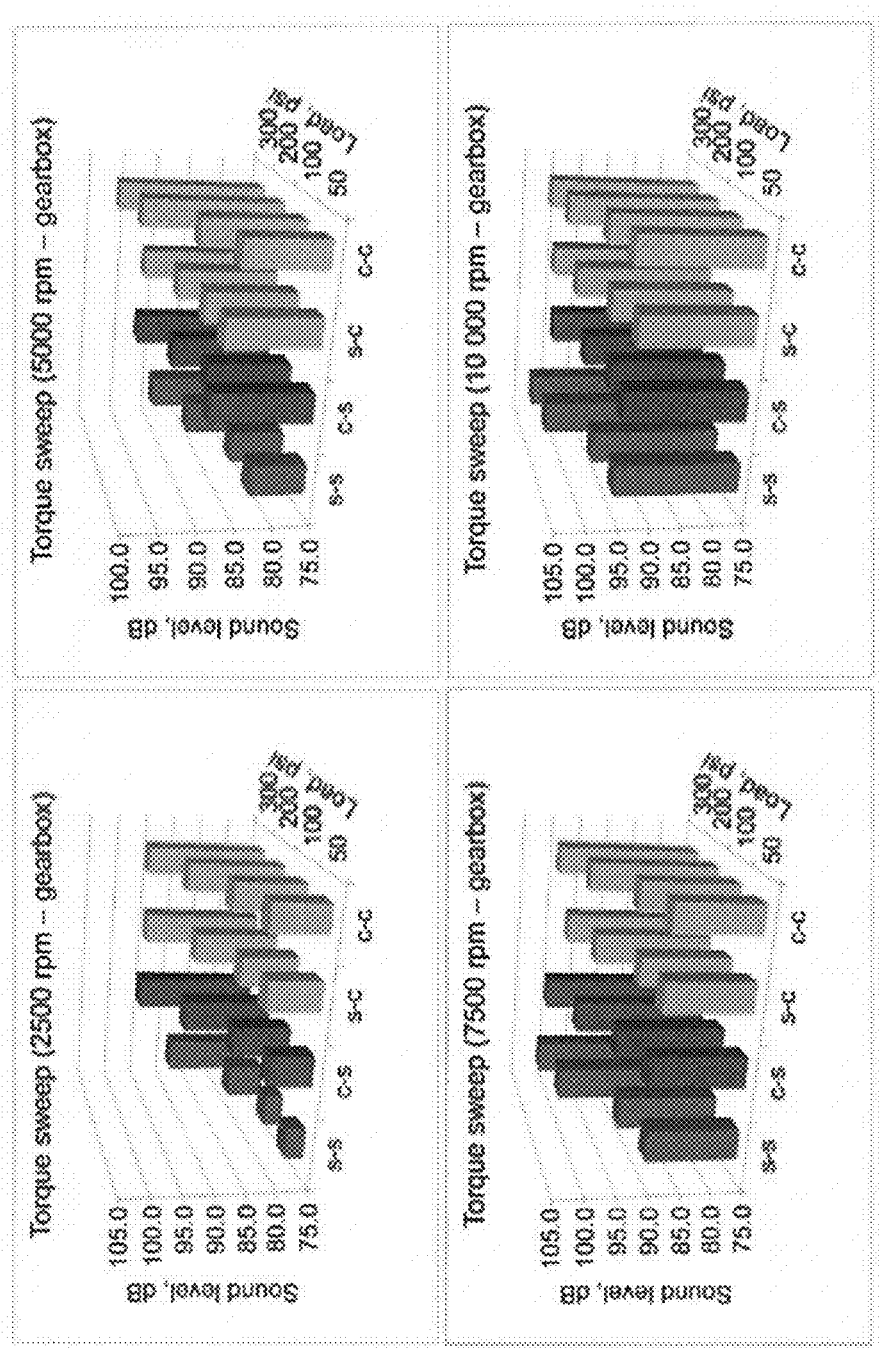

FIG. 10 illustrates sound level measurement data.

DETAILED DESCRIPTION OF THE DISCLOSURE

Mechanical components used in rotorcraft applications are designed such that the minimum weight is attained without sacrificing reliability or safety. Since the drive system is an appreciable percentage of the overall rotorcraft vehicle weight (~10%), many approaches have been applied to improve the power to weight ratio of these components. Past and current government-funded efforts for drive system technology has used power-to-weight ratio as the most critical performance metric. Through clever design modifications, configuration arrangements, and advanced materials, great progress has been made. Material properties of composites make them very desirable. Having a very low density, high stiffness, and high strength are three important properties that directly impact power to weight ratio. Therefore application of these materials to rotorcraft transmission static and dynamic components can help reduce overall drive system weight. The use of composites has been mostly limited in drive systems to housings and shafts. A number of critical issues were identified and addressed in these applications. These issues include metal-composite attachment, corrosion, strength, etc. Several tests were performed on the composite gears to identify the issues that need to be addressed to allow this technology to be suitable for rotorcraft drive systems.

Figure 1A:
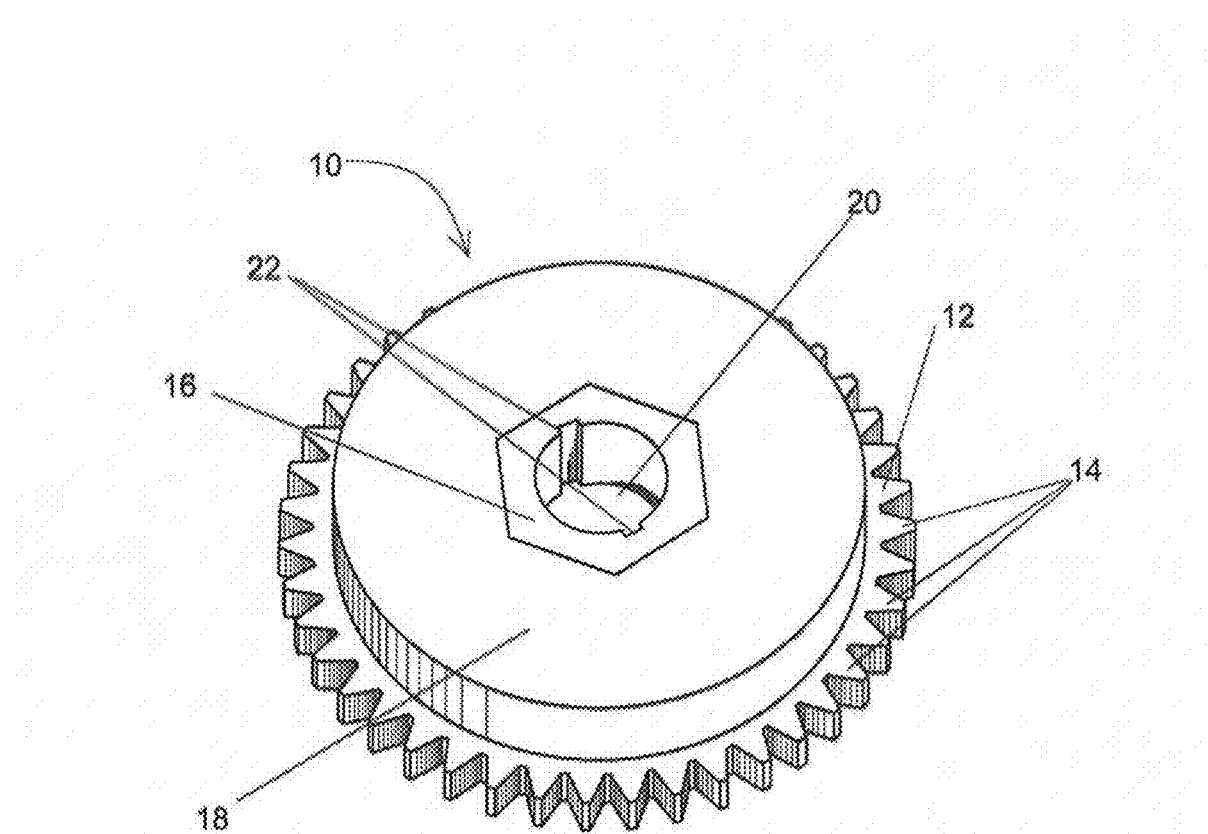

The preferred embodiment, as shown in FIG. 1A reveals a hybrid gear 10 that can transfer the same levels of torque and power as an all-metallic traditional gear of the sort used in rotorcraft drive systems where light weight is a most desirable attribute. Of great importance also is quieter operation that such a hybrid gear 10 can provide, along with a lower degree of vibration transmission as well as a reduced manufacturing cost. A reduction of gear meshing induced noise and making lighter weight of the hybrid gear 10 would have a substantial advantage over current all-metal configurations. More specifically, the present hybrid gear 10 contemplates the use of a web 18 constructed of fiber and resin composites, in combination with a gear hub portion 16 and metal gear rim portion with a plurality of teeth 14.

The fiber component of the fiber-and-resin composite is selected from the group of inorganic fibers including but not limited to quartz, ceramic, glass, carbon, and metal; and organic fibers including but not limited to aramid.

The resin component of the fiber-and-resin composite is selected from but not limited to the group of resins including epoxy, polyester, bisaleimide, and polyimide. Alternatively, a metal such as aluminum could be selected in place of a resin to form a metal matrix composite rather than a fiber-resin composite.

Whereas prior art gears of the sort used in rotorcraft are all metallic (steel), such construction involves large amounts of machining from forged gear blanks. The hybrid gear 10 of the preferred embodiment will reduce the amount of material removal from forgings. Also, the all metallic gearing components do little to dampen the gear meshing noise induced by the tooth stiffness changes during the meshing process. As shown in FIGS. 1A, 1B, 1C and 1D (1A-1D) with a composite web 18, the metallic pathway for vibration and noise transmission will be disconnected due to a material change between the hub 16 and the gear-rim 12 having gear teeth 14.

This detailed description of the present hybrid gear 10 consists of two parts, the first being a general description of several embodiments of the hybrid gear, and the second part being a discussion of a comparison of the hybrid gear with an all metal gear of a sort that the hybrid is intended to replace in service.

A. GENERAL DESCRIPTION

First Embodiment

FIG. 1A shows an oblique perspective view of a hybrid gear 10 according to the present disclosure consisting of an outer metal gear rim portion 12, having gear teeth 14 projecting outward from the gear rim portion, and an inner hub portion 16, the rim and hub portions being separated from one another and held in rigid relationship by a web 18 made of fiber-resin composite material. The hub portion 16 has a hole 20 therethrough, to accommodate a shaft. FIG. 1B is an orthogonal top view of the hybrid gear 10, along with the rim 12, gear teeth 14 and the hub 16 and the composite web 18 joining the gear rim portion 12 and the metal gear hub portion 16. The dotted hexagon shape 24 is a hidden from view inner boundary of the metal rim portion 12 that carries the gear teeth 14. FIGURE IC is an orthogonal side view of the hybrid gear 10, generally illustrating the elevations of the respective rim portion 12, bearing the gear teeth 14, and the complete composite web 18 which hides from view the metal hub 16 which is indicated with dotted lines. The metal hub 16 can be constructed of steel.

The web 18 is a fiber-and-resin composite is selected from the group of inorganic fibers including but not limited to quartz, ceramic, glass, carbon, and metal; and organic fibers including but not limited to aramid. The resin component of the fiber-and-resin composite is selected from but not limited to the group of resins including epoxy, polyester, bisaleimide, and polyimide. Alternatively, a metal such as aluminum could be selected in place of a resin to form a metal matrix composite rather than a fiber-resin composite With reference to the two keyways 22 shown in the hole 20 in FIG. 1A, it should be noted that the hole and keyways are not necessarily specific or critical parts of the present hybrid gear 10; according to a preferred embodiment, the hub portion 16 might be designed so as to be integral with a shaft or attach to a shaft in some way other than is implied by the keyways.

Figure 1D:
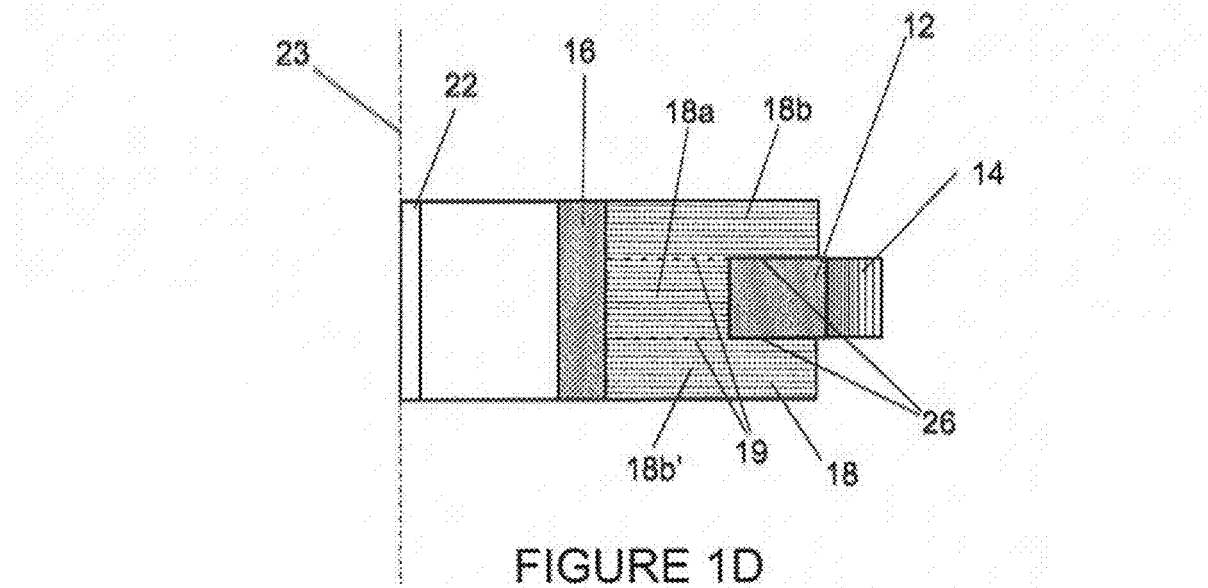
Figure 1B:
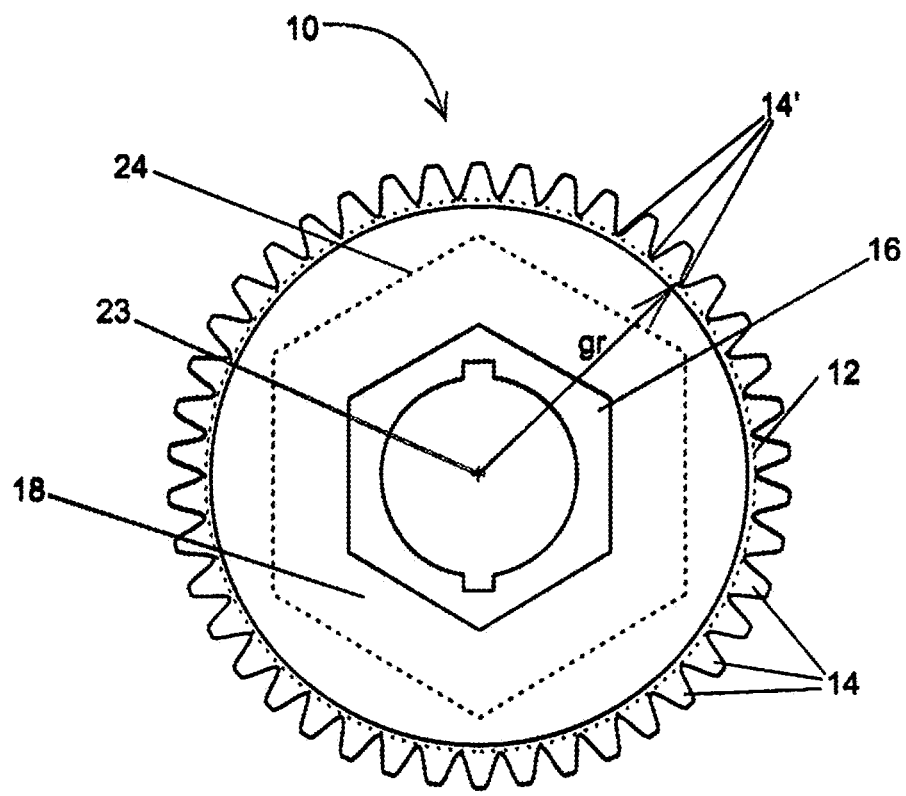

As generally shown in FIGS. 1A-1D, the complete composite web 18 consists of three parts: A set of inner ply layers comprising a web 18a, and a first set of outer ply layers 18b and a second set of outer ply layers 18b', as shown in the orthogonal cut-away view of FIG. 1D showing one side of the hybrid gear 10, with reference to axis 23 of the hub 16 of the hybrid gear 10. Shown also are the rim 12, with one gear tooth 14 being visible in this view, along with the web 18, which is fabricated of ply layers 18a,18b,18b' of fiber-and-resin composite material. The set of inner ply layers 18a is disposed so as to be sandwiched between two sets of outer ply layers 18b and 18b'. The sets of outer ply layers 18b,18b' are bonded to the rim 12 by an adhesive layer 26. Dotted lines 19 delineate the layer of inner plies 18a from the respective layers of outer plies 18b,18b'.

Figure 2A:
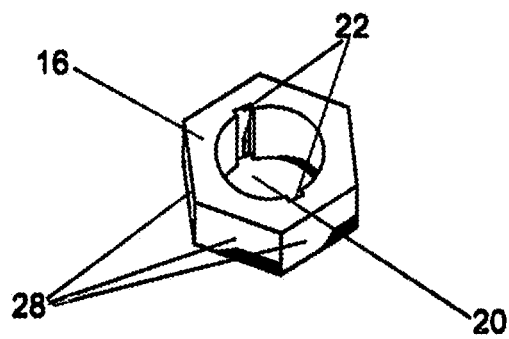
Figure 2B:
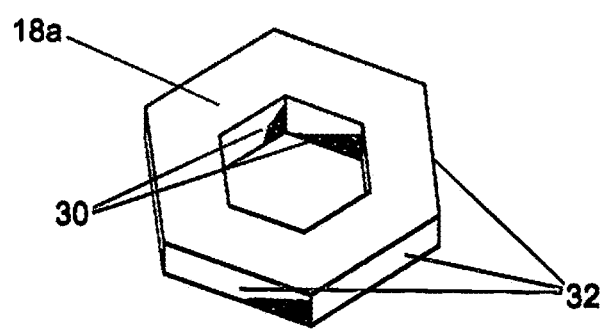
Figure 2C:
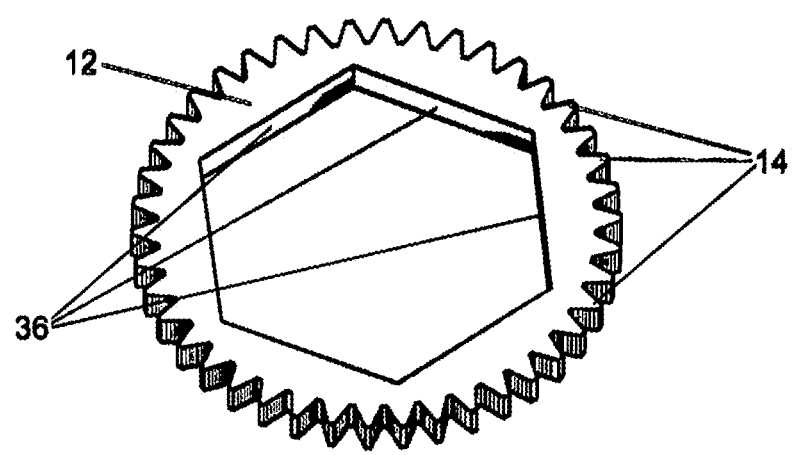

FIG. 1A is an oblique view of the assembled hybrid gear 10. FIGS. 2A, 2B and 2C are oblique views of the main parts of the hybrid gear 10, shown before assembly. FIG. 2A shows the hub 16, with a mechanical locking feature that has an outer shape 28 which is shown as a hexagon. While the shape of the mechanical locking feature is shown as a polygon, it is within the terms of the preferred embodiment for the mechanical locking feature to use any shape such as for example a polygonal shape, a sinusoidal shape or a toothed geometry. Whenever the term mechanical locking feature is used herein, it includes any shape such as for example a polygonal shape, a sinusoidal shape or a toothed geometry. FIG. 2B shows the layer of inner plies of fiber and resin comprising the web 18a (see also FIG. 1D), having a mechanical locking feature with an internal shape 30, which receives the corresponding mechanical locking feature having an outer shape 28 of the hub 16. FIG. 2C shows the outer rim 12, with teeth 14, and mechanical locking feature with an internal shape 36, which receives the mechanical locking feature of an corresponding outer shape 32 of the composite web layers 18a.

Figure 1C:
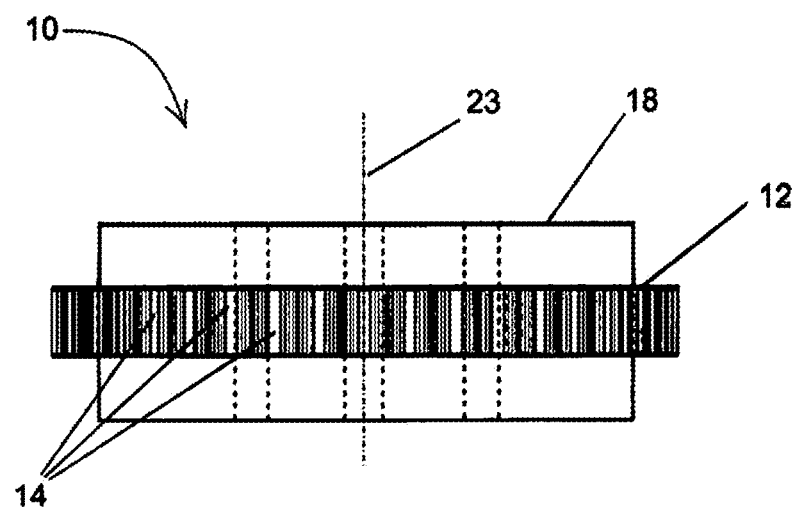
Figure 3:
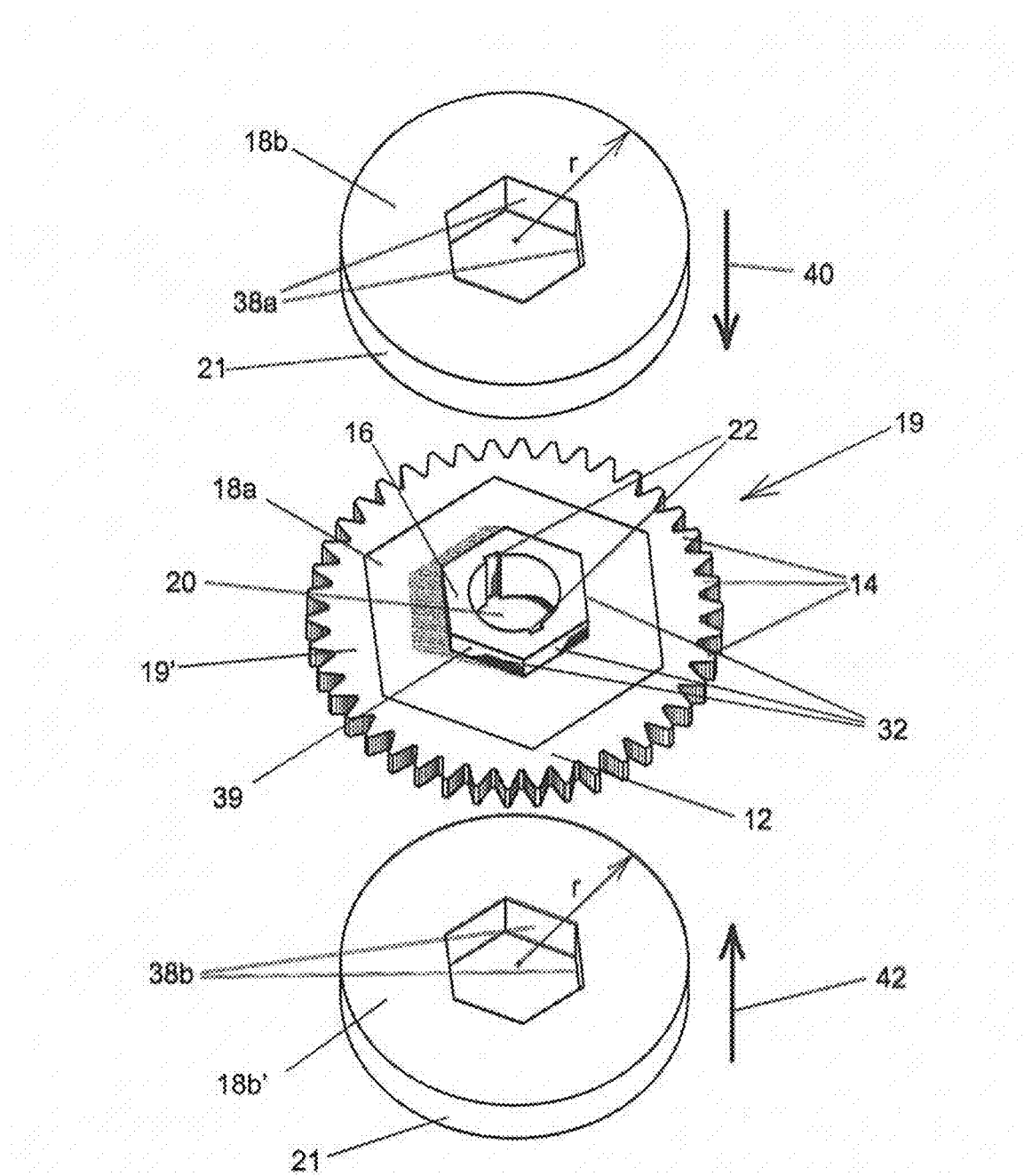

Referring now to FIG. 3, the assembled rim 12, main composite web layers 18a, and the hub 16 are in the middle region of this partially exploded view. A first layer of fiber-resin composite material 18b is disposed upon a first side 19' of an assembly 19 of the web 18a and gear rim portion 12 and the gear hub portion 16. A second layer of fiber-resin composite material 18b' is disposed upon a second side (not visible in FIG. 3) of the assembly 19 of the web 18a and gear rim portion 12 and the gear hub portion 16. The first and second layers of fiber-and-resin composite material 18b,18b' have a mechanical locking feature of an internal polygonal shapes 38a,38b corresponding to the external polygonal shapes 32 of the mechanical locking feature of gear hub portion 16. The first and second layers 18b,18b' have an external circular shape 21 having a radius r less than a radius gr of the gear teeth roots 14' (FIG. 1B). Arrows 40 and 42 indicate the placement of the first and second outer ply layers 18b and 18b', respectively, upon the assembly 19 of inner ply web layers 18a and the rim 12 and hub 16. The first and second outer ply layers 18b,18b' are bonded with adhesive to the set of inner ply layers 19a and to the rim 12 and to the external polygonal shape 28 of the hub 16. The fully assembled hybrid gear 10, according to this embodiment, is shown in FIGS. 1A, 1B, and 1C. In the final construction, the web 18a and the first and second layers of fiber-resin composite material 18b,18b' are bonded together. The final construction can be implemented as either a single co-cure process or by secondary bonding of previously cured layers 18a, 18b, and 18b'.

Second and Third Embodiments

Figure 4:
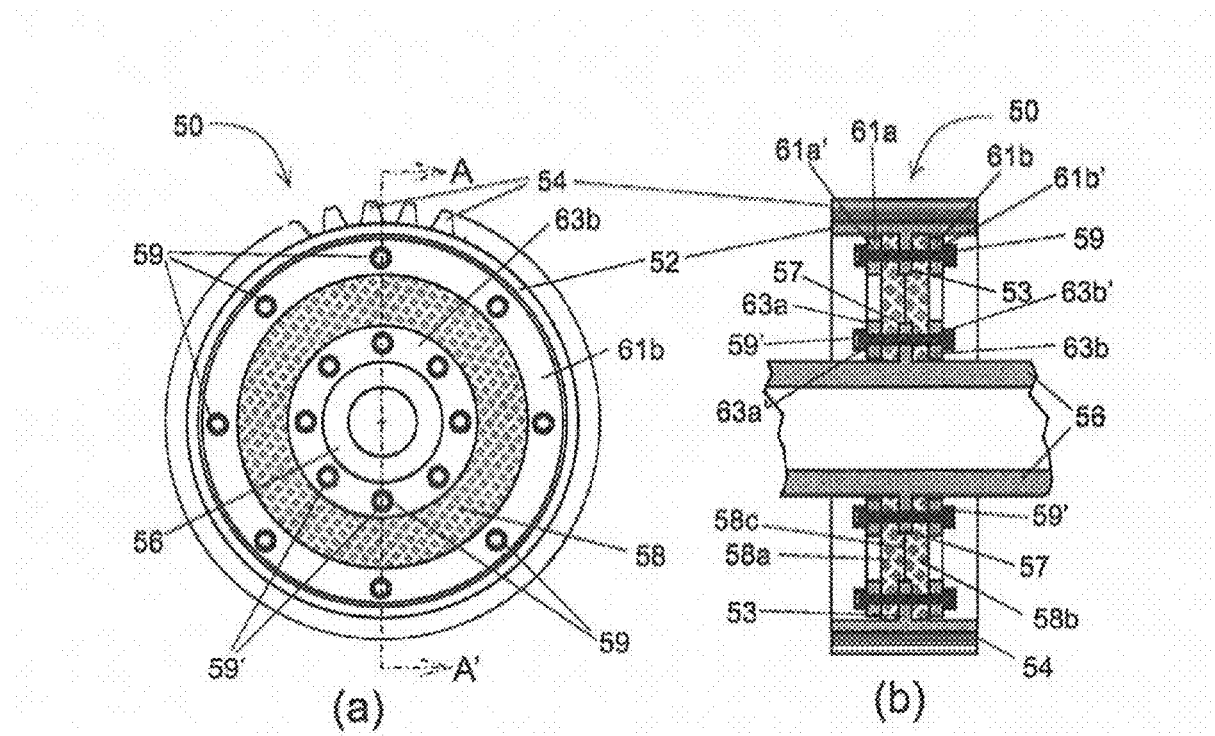

FIG. 4 is two orthogonal views of a second embodiment of a hybrid gear 50. View (a) is an axis-on view showing the hybrid gear 50 and its rim 52 with teeth 54 and hub and shaft portion 56, with a fiber-resin composite web 58. View (b) is a cut-away view according to the section A-A' indicated in view (a), revealing an annular rim flange 53, which is integral with the rim 52, and an annular hub flange 57 which is integral with the hub portion 56. The composite web 58, as shown in FIG. 4(b) consists of two halves 58a,58b that meet at interface 58c, receiving between them the rim flange 53 and the hub and shaft flange 57. A pair of outer metal constraining rings 61a, 61b, having a plurality of holes 61a',61b' therethrough, work to distribute compressive force of a plurality of fasteners 59 so as to secure the two web halves 58a,58b of web 58 against the rim flange 53. Similarly, with respect of the hub and shaft flange 57, a pair of inner metal constraining rings 63a,63b, having holes 63a',63b', distribute compressive force of a plurality of fasteners 59' so as to secure the two web halves 58a,58b of web 58 against the hub and shaft flange 57.

Figure 5:
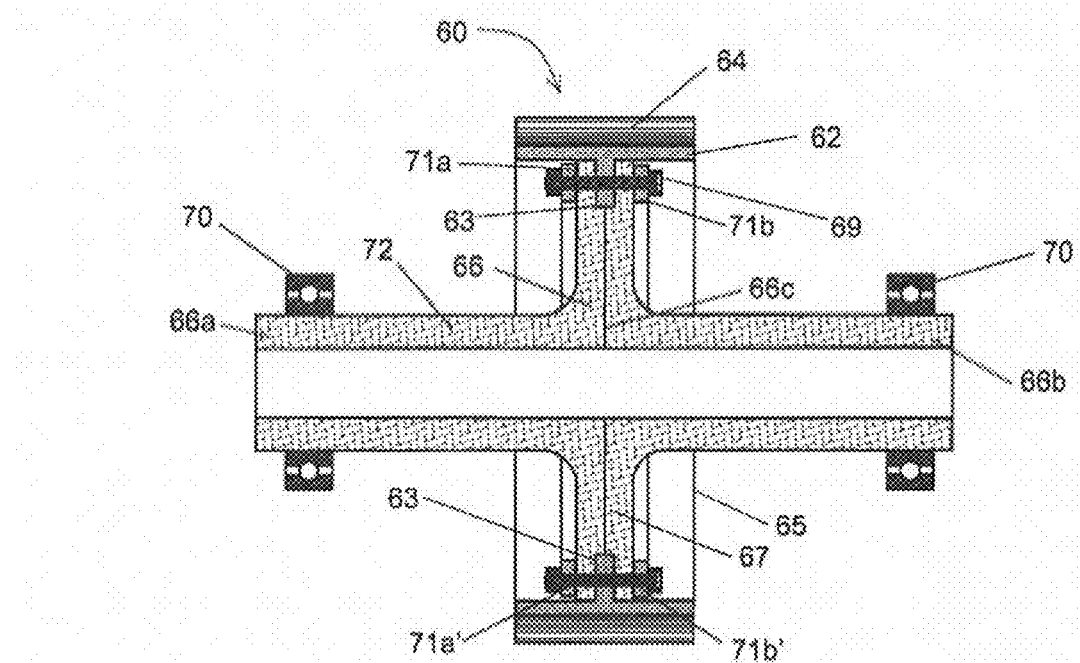

FIG. 5 is a cross-sectional view a third embodiment of a hybrid gear 60. The hybrid gear 60 consists of a metal gear rim portion 62 which carries gear teeth 64 around its outer perimeter 65. The hybrid gear 60 does not have a metal hub; rather it has a fiber-and-resin composite web and shaft 66 which consists of two half portions 66a,66b which meet at interface 66c. The metal gear rim portion 62 has an internal annular rim flange 63, to which the two web and shaft portions 66a,66b are rigidly joined by means of a plurality of fasteners 69 which pass through a pair of constraining rings 71a,71b (shown edge on, and analogous to constraining rings 61a,61b in FIG. 4(b)) and having holes 71a',71b'. The constraining rings 71a,71b distribute compressive force of the fasteners 69 over the web portion 67 of the composite web and shaft 66. The two parts of the composite web and hub portion 66a,66b, comprising a shaft 72, are carried in bearings 70.

The inventors envision the possibility of introducing features in the composite material or design that could reduce vibration/noise and also improve heat transfer. Damping materials could be applied internally or on the surface of the composite to absorb vibrational energy. Stiffness could be varied through composite fiber architecture or by component geometry to limit vibration frequencies that pass from the gear teeth to the hub. Material additions to the composite lay-ups with high-heat conduction capabilities would make the gear conduct heat from the teeth to the shaft through the composite material similarly to current technology.

According to a preferred embodiment, a method of constructing a hybrid gear comprises providing a metal gear rim portion; disposing a metal gear hub portion within the gear rim portion; and joining the gear rim portion to the gear hub portion with a web of a fiber-resin composite material joining the gear rim portion to the gear hub portion. The method includes constructing the fiber-and-resin composite is selected from the group of inorganic fibers including but not limited to quartz, ceramic, glass, carbon, and metal; and organic fibers including but not limited to aramid. The resin component of the fiber-and-resin composite is selected from but not limited to the group of resins including epoxy, polyester, bisaleimide, and polyimide. Alternatively, a metal such as aluminum could be selected in place of a resin to form a metal matrix composite rather than a fiber-resin composite.

In a preferred embodiment, the method includes disposing a first layer of fiber-resin composite material upon a first side of an assembly of the web and gear rim portion and the gear hub portion and a second layer of fiber-resin composite material upon a second side of an assembly of the web and gear rim portion and the gear hub portion.

The method also includes the steps of: providing the gear rim portion with an internal mechanical locking feature (for example a polygonal shape, a sinusoidal shape or a toothed geometry); providing the gear hub portion with an external mechanical locking feature; and providing the web with an external mechanical locking feature shape corresponding to the internal mechanical locking feature of the gear rim portion and an internal mechanical locking feature corresponding to the external mechanical locking feature of the gear hub portion. Further, the method includes providing the first and second layers of fiber-and-resin composite material with: an internal mechanical locking feature corresponding to the shape of the external mechanical locking feature of the gear hub portion; and an external circular shape having a radius less than a radius of the gear teeth roots.

B. DISCUSSION: FABRICATION OF HYBRID GEAR AND COMPARISON OF THE HYBRID GEAR WITH AN ALL-METAL GEAR

Composite/Metallic Hybrid Gear

Mechanical components that are lightweight and high-strength have obvious value to aerospace drive systems. The composite portion of the hybrid gear 10 was fabricated using a triaxial braid prepreg material made with T700SC 12K carbon fiber tows and a 350° F. epoxy matrix material. A 01±60 braid architecture was used so that in-plane stiffness properties would be nearly equal in all directions. Representative composite material properties are compared to that of the typical gear material AISI 9310, and are shown in Table 1. Materials with these characteristics have the potential to produce a design with a very high power to weight ratio.

TABLE 1

Materials as used in the test gears.

|  | Composite Material | AISI 9310 Gear Steel |
|---|---|---|
| Modulus of Elasticity (psi) | Tensile - $6.4 \times 10^6$ Compression - $6.1 \times 10^6$ | $29 \times 10^6$ |
| Poisson's Ratio | 0.3 | 0.29 |
| Density (kg/m3) | 1800 | 7861 |
| Thermal Conductivity | 9.4 (T700 fiber - axial) | 55 |
| Useful maximum temperature (° C.) as gear material | 150 | 175 |
| Coefficient of thermal expansion (micro-m/m) | 2 (in-plane) | 13 |
|  | Failure Strain (%) Tension - 1.89 Compression - 0.94 | Elongation (%) 15 |

There are other reasons for using a hybrid of composite and metallic elements in a gear. For example, gear meshing vibration and noise should benefit from this configuration by altering the acoustic path between the gear-mesh generating the noise and the housing that re-radiates the vibration and noise.

In theory it may be possible to produce a hybrid gear at reduced cost, as a portion of the machining required to reduce component weight would be eliminated. The manufacture process would have to be altered when making a hybrid gear to attain aerospace precision of the components.

Hybrid Gear Design and Manufacturing

The basic gear design used for in a study is summarized in Table 2. These gears have been used in the past for loss-of-lubrication testing and other experimental work within NASA [6-8]. Gears used were representative of aerospace precision prior to modification to a hybrid configuration.

Turning the gears into a hybrid configuration started with a portion of the web being machined away. The metallic teeth and attachment regions were kept. A hexagonal region was removed. This arrangement was chosen due to the number of teeth (42) on the gear to be modified. By using a six-sided feature, no sharp edge was located near a tooth fillet—root region where the highest bending stress is reached.

TABLE 2

Basic gear data for components tested

| Number of Teeth | 42 |
|---|---|
| Diameter Pitch | 12 |
| Circular Pitch | 0.26180000 |
| Whole depth | 0.196 |
| Addendum (in.) | 0.083 |
| Chordal Tooth Thickness (in.) | 0.1279 |
| Pressure Angle (deg.) | 25 |
| Pitch Diameter (in.) | 3.5 |
| Outside Diameter (in.) | 3.667 |
| Root Fillet (in.) | 0.04-0.06 |
| Measurement over pins (in.) | 3.6956 |
| Pin Diameter (in.) | 0.144 |
| Backlash Ref. (in.) | 0.006 |
| Tip Relief (in.) | 0.0005-0.0007 |
| Weight All-Steel Gear (lbf) | 0.8375 |
| Weight Hybrid Gear (lbf) | 0.7147 |

Two unique ply stacks were used for this configuration. The first ply stack was larger than the metallic portion that was machined away and had a circular outside geometry. This created an overlap onto the surface of the outer rim. This overlap created a bonding surface that was critical for proper composite to metal adhesion. The second ply stack configuration was cut to match the hexagonal region that was machined away from the metal gear. This tight fit provided a load path from the outer rim to the metallic inner hub.

An epoxy prepreg in conjunction with a quasi-isotropic braided fabric was chosen as the composite material. The fabric provides nearly in-plane isotropic properties that react similarly to that of the metallic features.

Prior to molding, any portion of the metallic features that were to come in contact with the composite were sandblasted and surface primed to promote good adhesion and increase bond-line strength.

A special fixture was then designed and fabricated to locate the gear rim and the gear hub prior to composite material lay-up. The gear teeth outer rim was located using the "measurement over pins." The inner metallic hub was located via its inner bore.

The first step in the lay-up process was to place the inner metallic hub by locating it around the feature in the mold center. During the assembly process, the larger ply stack was created by 12 layers of the prepreg. Each layer was rotated 60° in one direction to encourage the best isotropic behavior. With the first ply stack positioned and debulked, a film adhesive was added and the outer metallic ring was placed on top. The second ply stack was created in the void between the two metal features. The same "clocking" procedure was performed on these plies. Another layer of film adhesive was added and the final ply stack was added in the same fashion as the first.

The gear mold assembly was placed into a press and subjected to a 100 psi load. The press was then heated at a ramp rate of 4° F. per minute to a temperature of 250° F. A one-hour dwell was held at 250° F. to allow time for the metal and composite to reach a consistent temperature. The temperature was then increased to 350° F. using the same ramp rate. The temperature was held at 350° F. to fully cure the composite prepreg. After the cure cycle was complete the part was removed from the mold and any excess resin flashing was removed.

Free-Free Vibration Modes

A series of experiments using a modal impact hammer was conducted on a standard AISI 9310 steel spur gear and a hybrid spur gear specimen. The objective was to experimentally determine the modal properties of the hybrid spur gear and compare them to those of its conventional steel counterpart.

Additionally, a model of the conventional spur gear was generated using finite element software and subsequently compared with experimental data obtained from the test specimen. A further effort is underway to include hybrid material parameters into the model and correlate with modal data acquired from these experiments.

A series of modal experiments was conducted on a baseline steel gear and the hybrid gear to identify natural frequencies and calculate modal damping. An electric impact hammer was used to impact the gears in multiple orientations, with an accelerometer at the tip of hammer providing a trigger for the acquisition of acceleration data from the gear. In all cases, the single accelerometer was placed on the metal hub of the test gear with the accelerometer axis parallel to the rotational axis of the gear. This placement was chosen for convenience because it was accessible on both test specimens. Finite Element Analysis (FEA) demonstrated that most displacement would be in the axial direction for the modes of interest.

The test gear was suspended on rubber bands hanging on a rubber cord, with this soft support at the twelve o'clock position. The accelerometer was mounted on the metal hub in the six o'clock position. Both the steel gear and the composite gear were subjected to a series of impacts in the radial direction and a series of impacts in the axial direction. Axial impacts were concentrated at approximately the seven o'clock position on the gear at a radius just inboard of the teeth. For the composite gear, this location was at the edge of the composite portion of the gear. For radial impacts, a tooth near the ten o'clock position was impacted at the tip. A nylon bolt on either side of the tip was used to more effectively set the standoff distance between the tip and the gear, enabling more consistent impacts between tests. A total of ten impacts were performed in each of these four configurations.

Impact Study

Figure 6:
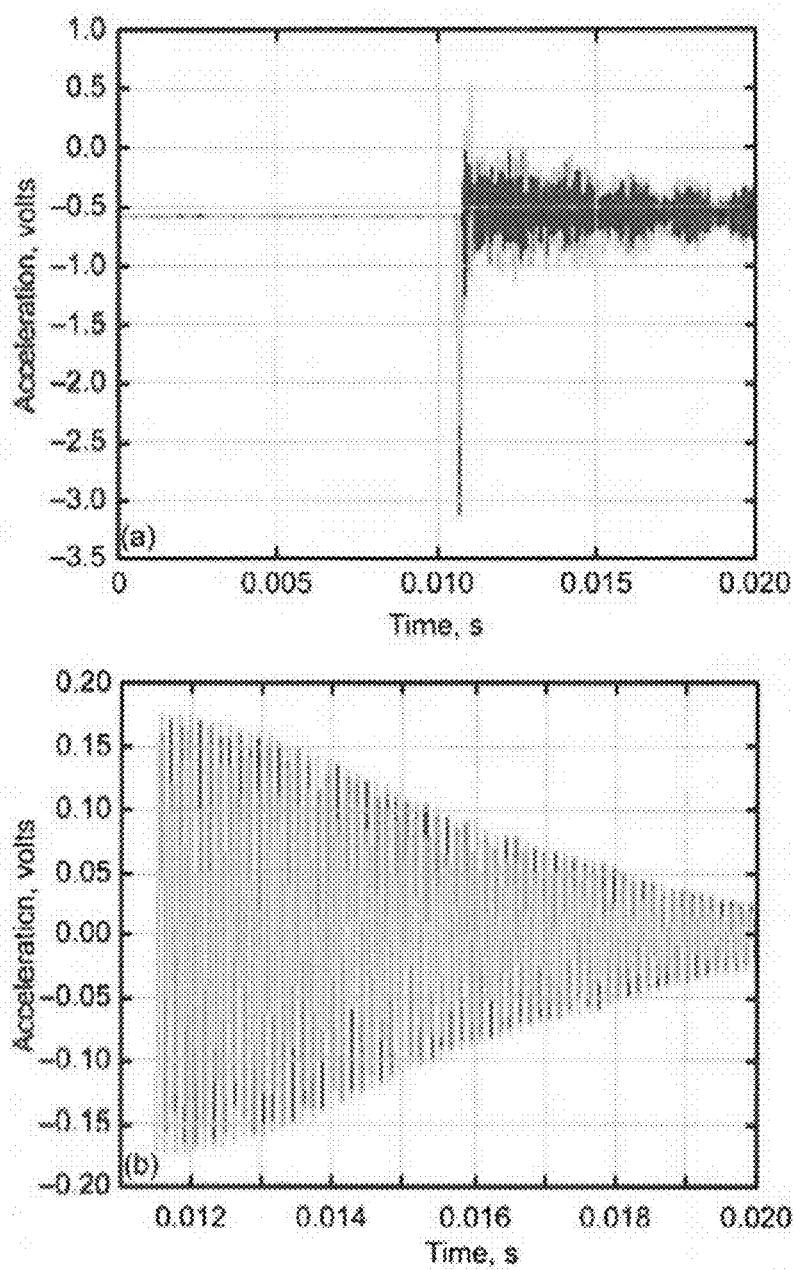

The time-domain data signal was imported into an automated signal analysis and filtering software package. The data was then filtered to isolate the signal associated with the natural frequency corresponding to the first nonrigid body mode. The log decrement was calculated for each filtered data set. From this calculation, modal parameters of the hybrid specimen and its steel counterpart were estimated and compared. FIG. 6 depicts an example of both a raw and a filtered data set.

Additionally, the unfiltered results of each impact were viewed in the frequency domain to compare results within configuration groups. These are depicted in FIG. 7. These figures each show the frequency data from four of the ten impacts for each configuration.

The finite element mesh is a solid mesh consisting of 19152 linear tetrahedron elements and having a total of 31002 nodes. The characteristic element size is approximately 0.10 in. The gear specimens are made from AISI 9310 steel, which is represented in the analysis as a linear isotropic material with Young's modulus of $29 \times 10^6$ psi ($2.0 \times 10^{11}$ Pa), Poisson's ratio of 0.29, and mass density of 0.284 lbm/in.3 (7861 kg/m3). The analysis is conducted on the unconstrained gear (free-free).

The first six modes identified in the analysis are rigid body translations and rigid body rotations; one mode is associated with each translational or rotational degree of freedom. Therefore starting at mode 7 to 12 the frequencies associated with these modes are shown in Table 4. The mode shapes found illustrated that the modal displacements are primarily in the axial direction for the modes of interest, guiding accelerometer placement.

TABLE 4

| All steel gear frequencies for modes 7 to 12 | |
| --- | --- |
| Mode number | Frequency, Hz |
| 7 | 7187 |
| 8 | 7270 |
| 9 | 12304 |
| 10 | 12853 |
| 11 | 12924 |
| 12 | 15237 |

TABLE 3

| Specimen Modal Property Estimates | | | | | |
| --- | --- | --- | --- | --- | --- |
| Impact position | | Axial | | Radial | |
| Gear Specimen | | 9310-T42 | Hybrid 42 | 9310-T42 | Hybrid 42 |
| Log decrement ($\delta$) | Mean | 0.0145 | 0.1296 | 0.0261 | 0.0543 |
| | Standard deviation | 0.0004 | 0.0263 | 0.0028 | 0.0122 |
| Damping ratio ($\zeta$) | Mean | 0.0023 | 0.0206 | 0.0042 | 0.0086 |
| | Standard deviation | 0.0001 | 0.0042 | 0.0004 | 0.0019 |
| General damping | Mean | 0.4843 | 2.9887 | 0.8725 | 1.2520 |
| constant (c) (lbf-sec/in.) | Standard deviation | 0.0143 | 0.6053 | 0.0928 | 0.2821 |
| Natural frequency ($\omega_a$)(Hz) | 9310-T42 | | 7219 ± 43 | N = 19 data samples | |
| | Hybrid 42 | | 6236 ± 62 | N = 14 data samples | |

Using the basic log decrement relationships, modal properties of the gears were estimated. These estimates are presented in Table 3. As expected, the hybrid gear exhibits higher damping properties than its steel counterpart. This has the potential to reduce transmitted vibration as compared to all-steel gears. Note, that the damping properties vary somewhat, depending upon the impact position. The experimentally determined mean and standard deviation of the natural frequency corresponding to the first non-rigid mode are also provided.

FEA Modal Study—Steel Gear

A modal analysis was conducted for the 42-tooth steel gear to verify natural frequencies identified in the experiment and to provide information on the associated mode shapes. The solid model of the gear captures the tooth geometry to a reasonable extent, but does not include subtle geometric features such as tip relief. For the purposes of a modal analysis however, the solid model is a close approximation to the test specimens.

FEA Modal Study—Hybrid Gear

A modal analysis was also conducted for the 42-tooth hybrid gear to verify natural frequencies identified in the experiment and determine the associated mode shapes. As in the case of the steel gear, the tooth geometry is a reasonable representation but does not include all subtle features of the teeth. The deviation of the model geometry from the physical specimens is expected to have a negligible effect on the modal results.

The finite element mesh is a solid mesh consisting of 25672 linear tetrahedron elements and having a total of 39166 nodes. The characteristic element size is approximately 0.10 in. The composite portion of the gear is constructed of prepreg, tri-axial braided carbon fiber with alternating orientation between adjacent layers, and resin. Due to the anisotropic nature of the material, consideration was given to modeling each individual ply with orthotropic properties. However, due to the large number of plies, it was determined that the composite portion of the gear could be modeled using isotropic properties.

The hub and ring portions of the gear were modeled using properties of AISI 9310 steel, which is represented in the analysis as a linear isotropic material with Young's modulus of 29×106 psi (2.0×1OH Pa), Poisson's ratio of 0.29, and mass density of 0.284 lbm/in.3 (7861 kg/m3). The composite portion of the gear is modeled as a linear isotropic material with Young's modulus of 6.4×106 psi (4.4×1010 Pa), Poisson's ratio of 0.30, and mass density of 0.055 lbm/in.3 (1522 kg/m3). The analysis is conducted on the unconstrained gear (free-free), and the components are treated as welded together (node-to-node constraint at the interfaces). It is notable that the calculated bulk modulus properties for the composite are not linear as the tensile elastic modulus of 6.4×106 psi compares to a compressive elastic modulus of 6.1×106 psi when using bulk properties, a difference of 5%. Based on the relatively minor difference and the square root dependence of frequency on stiffness, the bulk tensile modulus was used in this simplified case. Based on these small differences, it was decided to use the bulk properties to simplify the analysis.

Modes 7-12, identified in the analysis, are shown in Table 5. The first 6 modes are related to the rigid body translations and rigid body rotations.

TABLE 5

Hybrid gear finite element vibration modes and frequencies

| Mode number | Frequency, Hz |
| --- | --- |
| 7 | 7780 |
| 8 | 7913 |
| 9 | 13745 |
| 10 | 14592 |
| 11 | 15725 |
| 12 | 16483 |

Comparison of FEA to Experiment-Natural Frequencies

A comparison between the finite element output and the experimental results was conducted in the first step of validating the FEA model. FIG. 8 depicts a comparison between the measured frequencies of the steel spur gear specimen and the predicted frequencies of the finite element model. An exact frequency match falls directly on the diagonal. The result shows good agreement between model predictions and the experimental results.

For the hybrid gear on the other hand, modes identified in the experiment generally shifted to lower frequencies, whereas the model predicted a shift to higher frequencies. In the model, this is an expected result since the composite has a higher ratio of elastic modulus to density than steel, and the area moment of inertia is considerably larger for the cross section of the hybrid gear. However, the FE model assumes adjacent surfaces in components are bonded together.

Based on actual construction methods, the interfaces may have a lower effective stiffness such that the experiment would produce modes at frequencies lower than predicted. Changes to the interfaces can be made in the model to bring the natural frequencies within the ranges of the experiment, but this may not provide additional physical insight to the properties of the interface. However, such an approach may be employed to improve the model for subsequent stress analysis.

Unlike the steel gear, comparison between the hybrid gear finite element results and the experimental results did not produce similar mode frequencies as the all steel gear. From the experiments, the hybrid gear exhibits two significant peaks at approximately 6270 and 9743 Hz. The modes found from finite element analysis did not compare well to the experiments. It is expected that further model development will reduce some of these inconsistencies with the experimental data.

Dynamic Testing

Two types of dynamic tests were conducted to determine if gears could be considered as possible composite candidates in future rotorcraft drive systems. The first set of tests measured vibration and noise at four speeds and four levels of torque. The second test was an operational endurance test.

The dynamic tests for noise and vibration were conducted with four different gear arrangements at four different rotational speeds and four different levels of load. The gears were installed in the test rig in the following configurations: (1) all steel both sides, (2) hybrid gear left side, all steel gear right side, (3) all steel gear left side, hybrid gear right side, and (4) hybrid gear both sides. When the facility is operating, the left side gear is the driving gear and the right side is the driven gear.

For the four configurations mentioned above, tests were run at 2500, 5000, 7500, and 10000 rpm and at 133, 238, 448, and 658 in.*lb torque. The vibration level in "g's" is shown in FIG. 9. The noise level was measured via a hand-held sound level meter at a distance of 1 in. from the test gearbox cover. The sound level was recorded on an A-weighted scale. The results of the sound level data are shown in FIG. 10. The four test rig configurations are shown at four speed and load conditions.

From the vibration data shown in FIG. 9, the hybrid gear generally reduced the overall vibration level with a mixed or all hybrid configurations. For the noise data of FIG. 10 the mixed hybrid gear arrangement and all hybrid arrangement produced less noise for the two higher speed conditions.

Although some vibration and noise reduction was seen with the hybrid gears, the results were not as dramatic as expected. There are several reasons why noise and vibration had only modest reduction. First, the manufacturing process used to fabricate the hybrid gear did not result in aerospace quality accuracy. The composite curing actually reduced the backlash of the components due to stretching of the metal outside rim. The backlash also was not consistent around the gear. Both of these "manufacturing errors" could be corrected by post-composite-attachment final grinding of the gear teeth. The noise data is related to how well the teeth mesh during operation. In effect the noise measured at a small distance from the cover is a combination of airborne and structure borne from the meshing gear teeth being reradiated from the test facility cover.

Long-Term Testing

An endurance test was conducted on the hybrid gears in NASA's Spur Gear Test Facility. The hybrid gear arrangement was run for over 300×106 cycles (gear revolutions) at 10,000 rpm, 250 psi torque load (553 in.-lb torque) with an oil inlet temperature of ~120° F. The hybrid gears operated without any problem during this extended test period. The gears did not show any signs of fatigue during post-test inspection.

SUMMARY AND CONCLUSIONS

Based on the results attained in this study the following conclusions can be made:

1. Hybrid gear arrangement shows promise as the gears were operated for an extended period of time at a relatively high speed and torque.

2. Power to weight improvement could be possible—as steel webs could be replaced by lightweight composite material. For the gears tested, a 20% decrease in weight was realized without optimization of the components.

3. Reduced noise and vibration would be expected when manufacturing processing produces aerospace quality gears. The hybrid gears test only show modest improvements in vibration and noise. More significant improvements are possible with improved manufacturing processes and possible material tailoring through the composite structure.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a means) used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A hybrid gear, comprising:
   a metal gear rim portion with a plurality of gear teeth projecting outward or inward from the gear rim portion;
   a gear hub portion disposed within the gear rim portion; and
   a web of a rigid composite material joining the gear rim portion to the gear hub portion; a first layer of composite material disposed upon a first side of an assembly of the web
   a second layer of composite material disposed upon a second side of an assembly of the web and gear rim portion and the gear hub portion, wherein the second layer is separate from the first layer;
   wherein the gear rim portion has an internal mechanical locking feature with a first shape; the gear hub portion has an external mechanical locking feature with a second shape; and the web has an external mechanical locking feature with a third shape corresponding to the internal mechanical locking feature of the gear rim portion and an internal shape with a fourth shape corresponding to the external shape of the gear hub portion;
   wherein the first and second layers of composite material each have an internal mechanical locking feature having a fifth shape corresponding to the second shape of the gear hub portion; and an external circular shape having a radius less than a radius of the gear teeth roots;
   wherein the web and the first and the second layers of composite material are bonded or co-cured together.

2. The hybrid gear of claim 1 wherein the composite material is a fiber-and-resin composite including fibers selected from the group of inorganic fibers comprising quartz, ceramic, glass, carbon, and metal; and organic fibers comprising aramid.

3. The hybrid gear of claim 2 wherein the fiber-and-resin composite includes resin selected from the group of resins comprising epoxy, polyester, bisaleimide, and polyimide.

4. The hybrid gear of claim 1 wherein the composite material comprises:
   a metal matrix including a metal of aluminum; and
   fibers selected from the group of inorganic fibers comprising quartz, ceramic, glass, carbon, and metal; and organic fibers comprising aramid.

5. The hybrid gear of claim 1 wherein the gear rim portion and the gear hub portion are constructed of metal.

6. The hybrid gear of claim 5 wherein the gear rim portion and the gear hub portion are constructed of steel.

\* \* \* \* \*